United States Patent [19]

Giannuzzi et al.

[11] Patent Number: 4,960,360
[45] Date of Patent: Oct. 2, 1990

[54] RIVET ORIENTATION DEVICE AND METHOD

[75] Inventors: Ottavio Giannuzzi, Baldwin; Walter Woelfel, Walton, both of N.Y.

[73] Assignee: Grumman Aerospace Corporation, Bethpage, N.Y.

[21] Appl. No.: 381,886

[22] Filed: Jul. 19, 1989

[51] Int. Cl.5 ............................................. B65G 47/24
[52] U.S. Cl. ................................... 414/755; 198/380; 414/786
[58] Field of Search ............... 198/380, 395, 401, 389; 414/755, 786; 406/87

[56] References Cited

U.S. PATENT DOCUMENTS

| | | |
|---|---|---|
| 2,630,221 | 3/1953 | Stewart . |
| 3,260,347 | 7/1966 | Barnes . |
| 3,332,561 | 7/1967 | Hedborg .................... 414/755 X |
| 3,361,296 | 1/1968 | Whiteman . |
| 3,489,262 | 1/1970 | Roberts . |
| 3,494,014 | 2/1970 | Lundgren . |
| 3,517,795 | 6/1970 | Dixon . |
| 3,563,361 | 2/1971 | Piroutek . |
| 4,093,062 | 6/1978 | Sjogren ................... 198/380 |
| 4,219,110 | 8/1980 | Ubukata ................... 198/380 |
| 4,282,965 | 8/1981 | Bates et al. .............. 198/380 |
| 4,385,712 | 5/1983 | Maspero ..................... 221/13 |
| 4,440,286 | 4/1984 | Saxon ...................... 198/380 |
| 4,498,574 | 2/1985 | Fischer .................... 198/380 |
| 4,515,260 | 5/1985 | Wagner ...................... 193/44 |

*Primary Examiner*—Robert J. Spar
*Assistant Examiner*—Janice Krizek
*Attorney, Agent, or Firm*—Pollock, VandeSande & Priddy

[57] ABSTRACT

A rivet orientation device includes a horizontally extending track into which fed rivets drop. If the rivet is properly oriented, it will seat properly within the track and be pushed, by a plunger, to a robotic member pick-up point. However, if the rivet has been incorrectly oriented within the track, it will be subjected to compressed air thereby causing tumbling of the rivet and encouraging its proper orientation within the track. Once re-oriented a plunger guides the correctly seated rivet along the track to the pick-up point.

8 Claims, 2 Drawing Sheets 4,960,360

RIVET ORIENTATION DEVICE AND METHOD

FIELD OF THE INVENTION

The present invention relates to rivet-handling devices, and more particularly to such devices for orienting rivets from a supply source to a robotic arm.

BACKGROUND OF THE INVENTION

In the aerospace industry as well as others, robotics are quickly becoming a prominent means for fastening structural members. Due to the speed at which modern robotics operate, fasteners such as rivets are quickly fed to a delivery point so that the robotic end of an arm tool will have a steady and ready source of fasteners.

A problem often arises when a rivet is delivered to the pick-up point in an incorrect orientation. When this occurs the robotic end of an arm tool cannot operate properly and an assembly procedure must be shut down until the problem is corrected.

BRIEF DESCRIPTION OF THE INVENTION

The present invention is a fastener orientation device which quickly passes a properly oriented fastener, such as a rivet, from a feed tube to a delivery point for a robotic end of an arm tool. However, if the rivet has maintained an undesirable orientation, the device employs an air manifold system to orient the rivet correctly by tumbling the rivet in a chamber until it assumes a proper position in a track connecting the feed tube to the delivery point.

It should be emphasized that, although the present invention is discussed in terms of a rivet orienting device, it is equally applicable to other types of fasteners. However, for purposes of convenience, the following description of the invention will be discussed in terms of rivet fasteners.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
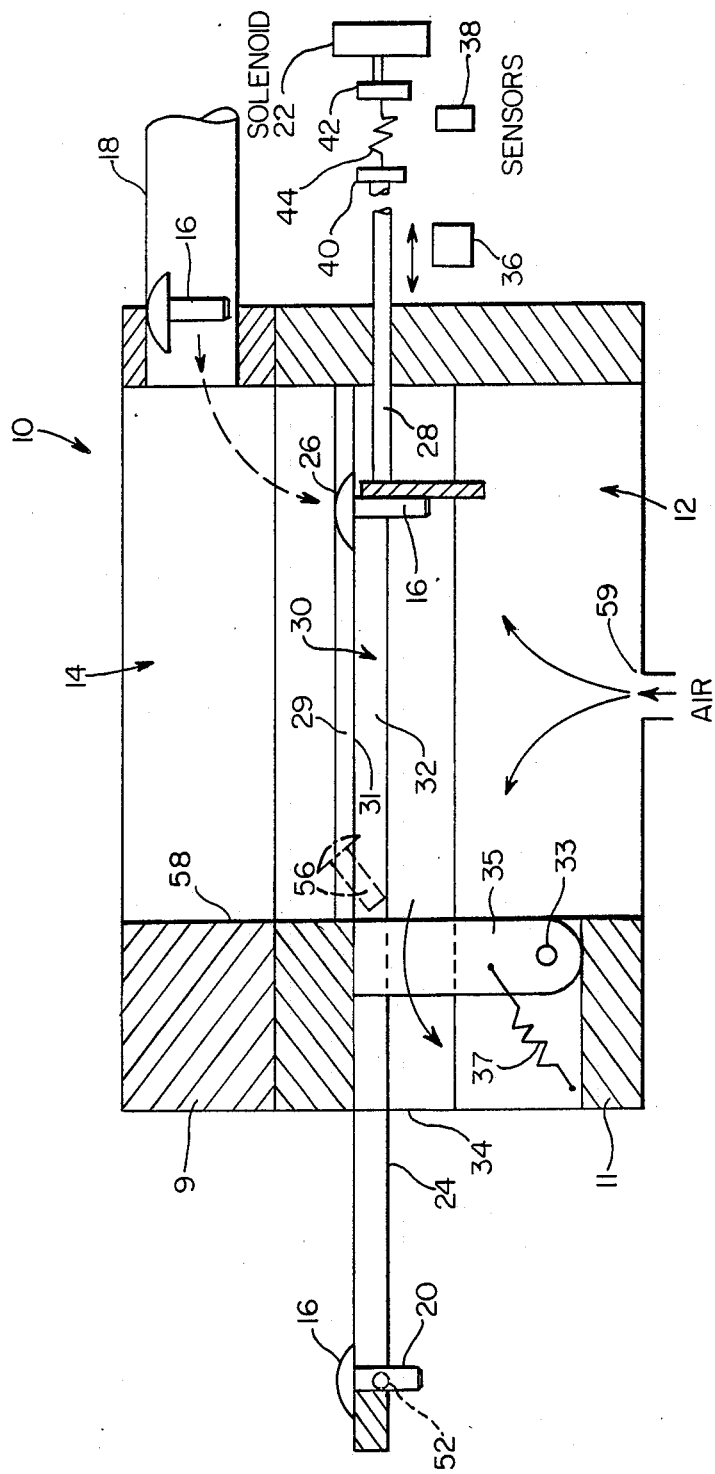
FIG. 1 is a diagrammatic sectional view of the rivet orientation device.

The rivet orientation device of the present invention is illustrated in FIG. 1 and is generally indicated by reference numeral 10. The device includes a housing having an upper section 9 and a lower section 11 which include respective chambers 14 and 12. The purpose of the orientation device 10 is to ensure that rivets 16 delivered from the outlet of a feed tube 18 into the orientation device 10 become properly oriented before they reach a delivery point 20 where they are to be picked up by a conventional robotic end of an arm tool. The feed tube 18 is part of a conventional rivet feeder system.

Figure 2:
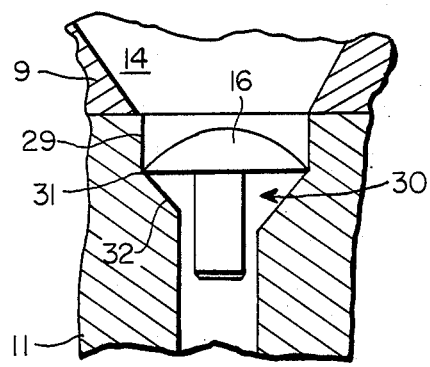
FIG. 2 is a partial longitudinal sectional view illustrating the disposition of a rivet within the track formed in the rivet orientation device of the present invention.
Figure 3:
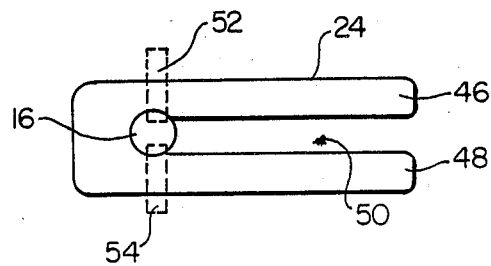
FIG. 3 is a top plan view of a delivery guiding track positioned at the outlet of the rivet orientation device for correctly orienting a rivet and a pick-up point for a robotic member.

In FIG. 1 a properly oriented rivet 16 is shown at position 26 after being fed from the outlet end of tube 18 and having fallen through an upper chamber 14 in the upper housing section 9 of the device. As shown in FIG. 2, the walls of the chamber 14 taper inwardly toward an elongated track 30 formed through the lower housing section 11 of the device. From FIGS. 1 and 2 the track 30 will be seen to include vertical sections 29 tapering inwardly toward inclined sections 32 with a shoulder 31 being defined therebetween to contact diammetrically opposite points of a head of rivet 16. With a rivet properly positioned in a track as shown in FIG. 2, the rivet may be pushed along the track 30 by a plunger 28. After the rivet travels the entire length of track 30, it is pushed to position 20, ready for pick up by a robotic member. During its travel along track 30, it encounters the rotationally movable control gate 35, connected at a lower end to pivot 33 and it is spring biased by spring 37 to normally assume a vertical position. When rod 28 urges a correctly oriented rivet 16 against the control gate 35, it yields downwardly as indicated by the arrow and the rivet is free to pass to the outlet 34 of the device 10 for continued passage along track extension 24 to point 20. The track section 24 begins at bifurcated ends 46 and 48 and has a central elongated slot 50.

Figure 4:
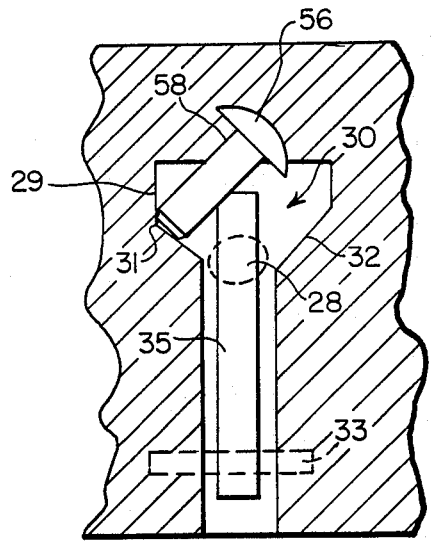
FIG. 4 is an end sectional view through the rivet orientation device illustrating a rivet incorrectly oriented in an internal track within the device.

However, if the rivet 16 falls into the orientation device in the wrong position or skips out of track 30, the rivet will not maintain the seated position shown in FIG. 2 but will rather assume an unseated position, relative to track 30, as shown in FIG. 4. When the rivet in the disoriented position is pushed against the control gate 35, the gate will only yield partially and the gate will urge the head 56 of the displaced rivet 16 against the stop portion 58 of the upper housing wall 9. Once this occurs, the plunger is withdrawn from continued contact with the rivet thereby causing it to fall back horizontally into the central portion of the track 30; and compressed air is introduced at inlet 59 to cause tumbling of the rivet within the upper chamber 14. The supply of compressed air is provided for a short fixed period of time, and after it stops the rivet will again be encouraged to maintain a proper seated position within track 30. The operation is repeated with plunger 28 pushing the rivet toward the device outlet; and if successful, the rivet will be pushed out to point 20. If not, it will again hit the stop at 58 and a further attempt is made with the provision of compressed air. The cycle may be repeated a number of times until the recalcitrant rivet assumes a proper position.

In order to determine whether the plunger 28 has succeeded in pushing a rivet 16 to the outlet 34, it is necessary to provide the plunger with position-sensing devices. An elementary means for completing the sensing is shown in FIG. 1 and will be presently discussed. The plunger 28 may be provided with an exteriorly situated intermediate stiff spring section 44 bounded on both ends thereof by highly reflective enlargements 40 and 42. Photoelectric sensors 36 and 38, of conventional design, may be positioned adjacent and parallel to the travel of plunger 28. A solenoid or other conventional transducer 22 is connected to the outward end of plunger 28 for providing the motive power thereto. If a properly positioned rivet is pushed past the control gate 35, then the enlargement 40 will be detected by sensor 36 thereby indicating progress of the rivet to this point.

Photo-optical transmitter and receivers (52, 54) of conventional design may be mounted in track section 24 at the point 20 for detecting the presence of a delivered rivet at this delivery point. Simple conventional electronic logic (not shown) will detect the occurrence of signals at sensors 36, 52, and 54 thereby establishing the successful transferral of a rivet 16 through the entire orientation device 10 for pick up at point 20.

If, however, a rivet becomes jammed at stop 58, spring 44 will yield as the solenoid 22 continues its displacement of plunger 28 thereby effecting alignment of solenoid 22 and its respective sensor 38. This will occur after sensor 36 is activated by enlargement 40. Of course, the photo-optical means transmitter and receiver 52 and 54 will not be activated, since a rivet has not successfully passed to point 20. Again, simple electronic logic will detect the activation at sensors 36 and 38 but not of transmitter and receiver 52 and 54, thereby signalling the occurrence of a jammed rivet. This will operate a simple compressed air valve or source (not shown) to introduce compressed air at inlet 59 to achieve the tumbling action of the rivet as previously discussed. Of course, the control means discussed in connection with the positional sensors of plunger 28 and rivet 16 are merely indicated for illustrative purposes and many different types of prior art position detecting sensors may be employed.

Thus, by virtue of the present invention, it will be appreciated that a simple compact and reliable device may be realized for ensuring proper rivet orientation between the outlet end of a rivet feed tube and the pick-up point of a robotic member.

It should be understood that the invention is not limited to the exact details of construction shown and described herein for obvious modifications will occur to persons skilled in the art.

I claim:

1. A fastener orientation device comprising:
   means for feeding fasteners to an inlet;
   a track for conveying the fasteners to an outlet;
   an upper chamber located above the track and communicating therewith;
   a lower chamber located below the track and communicating therewith;
   a plunger aligned with the track for moving each fastener between the inlet and outlet of the device when the fastener is properly oriented;
   a stop for contacting and preventing passage of an improperly oriented fastener from completing its travel to the outlet;
   means for introducing a pressurized fluid into the lower chamber when the fastener is contacted by the stop thereby causing dislodgment of the fastener from the track and momentarily tumbling the fastener in the upper chamber, cessation of the tumbling causing the fastener to re-enter the track for movement to the outlet; and
   means for guiding a fastener from the outlet to a pick-up point.

2. The structure set forth in claim 1 together with means for detecting a halted fastener at the stop thereby enabling the start of a tumbling operation.

3. The structure set forth in claim 1 together with a spring-biased control gate positioned in line with the track and serving to urge a fastener against the stop when improperly oriented, but yielding to the fastener when properly oriented.

4. The structure set forth in claim 2 together with means located at the pick-up point for detecting the successful transfer of a fastener thereto.

5. The structure set forth in claim 2 together with:
   a spring-biased control gate positioned in line with the track and serving to urge a fastener against the stop when improperly oriented, but yielding to the fastener when properly oriented; and
   means located at the pick-up point for detecting the successful transfer of a fastener thereto.

6. The structure set forth in claim 5 wherein the fastener is a rivet.

7. A method for ensuring proper orientation of a fastener comprising the steps of:
   feeding the fastener to a first point;
   guiding the fastener along a track between the first point and second pick-up point;
   stopping the fastener before the second point if it has an improper orientation;
   exposing the fastener to a fluid blast thereby tumbling the fastener if it becomes stopped thus enabling the fastener to assume a proper orientation thereafter; and
   interposing an obstruction in the track which yields for a properly positioned fastener but which retains an improperly oriented fastener in a stopped position until it is tumbled into a proper orientation.

8. The method set forth in claim 7 together with the steps of:
   detecting the occurrence of a stopped fastener; and
   detecting the arrival of a fastener at the pick-up point.

* * * * *